3,378,352
PROCESS FOR EXTRACTING THORIUM
AND RARE EARTHS
Robert D. Hansen, Midland, Mich., assignor to The Dow Chemical Company, Midland, Mich., a corporation of Delaware
No Drawing. Filed Dec. 15, 1965, Ser. No. 514,127
8 Claims. (Cl. 23—341)

ABSTRACT OF THE DISCLOSURE

An improved solvent extraction process for the recovery and separation of thorium and rare earth values from acidic aqueous solutions containing such values and which also can include a relatively large concentration of ferric iron which comprises contacting the aqueous acidic solution with a substantially water-immiscible liquid organic extractant comprising a mixture of a dialkyl substituted orthophosphoric acid and a second phosphonyl group containing member thereby to preferentially extract thorium and other rare earth metal values from the aqueous phase into the organic phase. Thorium and rare earth are separated by contacting the organic extract with either hydrochloric or nitric acid thereby to strip the rare earth metal values into the acid phase. Unexpectedly, excellent recoveries and separation of thorium and rare earths substantially free from iron are realized in this simple integrated process.

---

This invention relates to a process for recovering metal values from acidic aqueous media and more particularly is concerned with an improved solvent extraction process for the separation of thorium values from yttrium and other rare earth metal values.

Organic liquid extraction solvents such as monoalkyl substituted orthophosphoric acids, e.g. dodecyl orthophosphoric acid and heptadecyl orthophosphoric acid, commonly employed to extract thorium values from acidic aqueous solutions cannot be used to co-extract yttrium and other rare earth metal values from solutions which also contain relatively large concentrations of ferric iron without first reducing the ferric iron to the ferrous state. This presents a problem in many thorium and yttrium recovery operations since ferric iron is an impurity normally associated with source materials containing these metal values.

It is a principal object of the present invention to provide an improved process for the separation of thorium values from yttrium and other rare earth metal values following the recovery of such metal values from acidic aqueous solutions.

It is a further object of the present invention to provide a one-step solvent extraction process for the recovery of thorium and rare earth metal values from acidic aqueous solutions containing relatively large concentrations of ferric iron.

Other objects and advantages will become apparent from the detailed description presented hereinafter.

The present invention provides an improved solvent extraction process for the recovery of metal values from various acidic aqueous solutions containing thorium and rare earth values such as, for example, acidic aqueous barren leach liquors resulting from uranium ore processing. The present novel process is particularly suitable for recovering thorium values and rare earth values from acidic aqueous solutions which contain these metals as well as other metal impurity values including relatively large concentrations of ferric iron.

The terms "rare earths" and "rare earth metals" as used herein includes scandium and yttrium as well as those elements having atomic numbers from 57 to 71 inclusive. (See Ephraim "Inorganic Chemistry," edited by Thorne and Roberts, 5th edition revised, Interscience Publishers, Inc., pages 435–438, 1949.)

In carrying out the process of the present invention, an acidic aqueous medium containing thorium, yttrium and other rare earth metal values and which usually has other metal impurity values associated therewith is contacted with a substantially water-immiscible liquid organic extractant comprising a mixture of a dialkyl substituted orthophosphoric acid and a second phosphonyl group containing member thereby extracting the thorium and other rare earth metal values from the aqueous phase into the organic phase. The two phases are separated. The organic extract of thorium and rare earth metal values is contacted with either hydrochloric acid or nitric acid whereby the rare earth metal values are stripped from the organic solvent phase and taken into the aqueous acid phase, substantially all of the thorium values remaining in the organic phase. The thorium values and the rare earth metal values can then be recovered from their respective phases by any of a variety of separation techniques.

Organic extractants suitable for use in the instant process are substantially water-immiscible liquid mixtures comprising a dialkyl substituted orthophosphoric acid (I) and a second phosphonyl group containing member selected from the group consisting of trialkyl phosphates (II), dialkyl alkylphosphonates (III), alkyl dialkylphosphinates (IV), and trialkylphosphine oxides (V), or mixtures thereof. These substituted phosphonyl compounds have the general formulae:

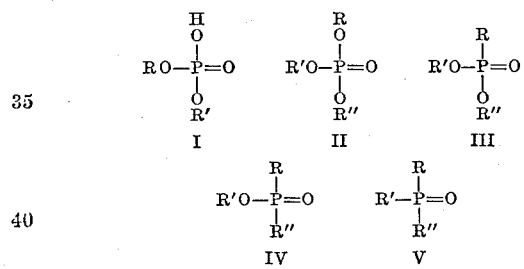

wherein each R, R', and R" is an alkyl group containing from 4 to about 18 carbon atoms.

The molar proportions of the dialkyl substituted orthophosphoric acid and said second phosphonyl group containing member to be employed in the present process range from about 3:1 to about 1:3. Ordinarily molar proportions of from 2:1 to 1:1 are employed.

The quantity of organic extractant solvent mixture ordinarily used us such that the amount of the dialkyl substituted orthophosphoric acid present is at least stoichiometrically equivalent to the thorium and rare earth metal values to be extracted. An excess of the dialkyl orthophosphoric acid over the amount of stoichiometrically required is frequently advantageously employed to achieve optimum extraction of thorium, yttrium, and other rare earth values when employing short extraction contact times which are preferred in order to minimize the extraction of ferric iron.

The organic extractant can be used directly to extract metal values from acidic aqueous solutions. However, advantageously this extractant can be carried in a suitable solvent or diluent, i.e. carrier. Suitable solvents or diluents are those substantially water-immiscible liquids in which both the extractant and the metal value containing extract are soluble. Examples of suitable carriers are kerosene, aliphatic hydrocarbons, aromatic hydrocarbons, halogenated aliphatic and aromatic hydrocarbons, fuel oils, ethers and the like.

When the extractant is carried in such a solvent or diluent, concentrations of the dialkyl substituted phosphoric acid ranging from about 0.05 to about 1 mole per liter usually are employed. Ordinarily, dialkyl phosphoric acid concentrations of from 0.1–0.3 mole per liter are used, 0.1–0.2 mole per liter being preferred.

The aqueous metal value containing source liquor:extractant phase ratio to be employed is not critical. For a given operation this phase ratio is dependent upon the concentrations of the metal values to be extracted, the concentration of the dialkyl substituted orthophosphoric acid in the extractant phase, the excess, if any, of said dialkyl phosphoric acid to be employed, and the extraction contact time. Usually conditions are predetermined so that the handling of large and uneconomical volumes of aqueous source liquors and extractant solutions is avoided.

In the present novel process, the contact time utilized to extract the thorium and rare earth metal values from the original metal value containing liquor or source material into the organic extractant phase may vary from about 15 seconds to about 5 minutes or more. Short contact times ranging from about 0.5 to about 1 minute are preferred. These short contact times offer the advantage of providing optimum thorium and rare earth metal extraction and minimizing the extraction of ferric iron.

Temperature is not critical in the extraction step of the instant process, the only essential requirements being that the phases be liquids having viscosities, vapor pressure, and other properties which will permit practical operation at a predetermined temperature in the equipment employed. Conveniently, extraction is usually carried out at ambient temperatures.

After separation of the metal value containing organic extract from the aqueous raffinate, the extract is contacted with hydrochloric acid having a concentration of from about 6 M to about 12 M, or with nitric acid having a concentration of from about 0.5 M to about 12 M, to strip the rare earth metal values from the organic phase. Ordinarily the hydrochloric acid concentration to be employed is from about 9 M to about 12 M, and preferably about 12 M. The higher preferred hydrochloric acid concentrations promote more selective stripping; that is, the stripping of thorium values from the organic extract into the acid phase is minimized and optimum separation of thorium values from rare earth values is accomplished. Lower strength acid, however, i.e. about 6 M, may be preferred for economic reasons in some instances wherein conditions are such that acceptable stripping selectivity is achieved with such lower strength acid. Nitric acid concentrations are ordinarily from about 1 M to about 3 M, and preferably about 1 M.

Organic extract:acid phase volume ratios from 1 to 30 can be employed in the stripping operation, the preferred extract:acid volume ratio being about 15. The higher organic extract:acid volume ratios are preferred to minimize the stripping of thorium into the acid phase.

The rare earth value containing aqueous acid phase and the thorium containing organic phase are separated.

The thorium and rare earth metal values can be recovered from their separated phases by conventional techniques as are well known to one skilled in the art. To illustrate, the thorium containing organic extract may be contacted or washed with water to remove any small amounts of iron which may be present prior to the recovery of the thorium values therefrom. The washed organic extract can, for example, be contacted with an aqueous 10% HF solution to precipitate the thorium as $ThF_4$. The organic extractant can then be recycled for subsequent reuse following the removal of the precipitate by filtration or similar means.

The rare earth metal values can be recovered, for example, by partially distilling the stripping acid from the acid strip solution and contacting the resulting concentrated solution with oxalic acid or sodium hydroxide to precipitate the rare earth metal values. Dilution of the rare earth metal containing concentrate with water may be desirable prior to contacting it with the precipitant. The precipitated yttrium and other rare earth metal values are separated readily by filtration or similar means.

Other recovery techniques such as crystallization, solvent evaporation or the like can also be employed.

The present process can be employed with thorium, yttrium, and other rare earth metal containing aqueous acidic solutions or mixtures resulting from various sources such as the leaching of ores, the pickling of metals, the dissolution of scrap, etc. The pH of acidic aqueous media from these and other sources may vary widely. The pH of metal value containing liquors from which metal values are to be recovered is not a critical factor in the instant process. It is usually desirable, however, to adjust the pH of the source liquor with a suitable acid or base so that the pH is within the range of from about 0.4 to about 3. It is preferred that the pH be from about 1.0 to about 2.5. One particularly suitable metal source is uranium depleted leach liquor, known in the art as "barren leach liquor," resulting from the recovery of uranium values from acidulated uranium ores. These liquors frequently contain appreciable quantities of thorium values, yttrium and other rare earth values, as well as other impurity metal values including ferric iron.

The instant process can be adapted to either batch or continuous operations. The extraction and acid stripping steps can be carried out using, for example, simple mixing tanks, mixer settlers, direct or counter-current flow columns, centrifugal contactors or other suitable equipment. Counter-current flow liquid-liquid contactors are preferred. In batch acid stripping operations, a second contact with stripping acid is frequently employed to assure substantially complete stripping of yttrium and other rare earth metal values from the organic extract.

Operability of the present process has been demonstrated in actual operations wherein thorium and rare earth metal values have been recovered using the process of the present invention from an aqueous barren leach liquor resulting from the sulfuric acid treatment or a uranium ore. The barren leach liquor having a pH of about 1.5 and containing about 0.3 g./l. Th, 0.2 g./l. Y, 0.7 g./l. $Fe^{+++}$, 0.7 g./l. $Fe^{++}$, 0.5 g./l. Ca and 0.5 g./l. Al was contacted for a period of 30 seconds with an extractant solution consisting of 0.1 M di-(2-ethylhexyl) phosphoric acid (DEHPA) and 0.1 M tributyl phosphate (TBP) in kerosene. A 110% excess of DEHPA over the amount stoichiometrically equivalent to the thorium and yttrium values contained in the quantity of aqueous barren leach liquor contacted with the extractant was employed. The resultant thorium and yttrium containing organic extract was separated from the residual aqueous leach liquor, and the yttrium values were stripped from the extract by twice contacting the loaded extract with 12 M hydrochloric acid at an organic:aqueous volume phase ratio of 15. After separation of the stripped organic extract and the hydrochloric acid solution, analysis of the residual organic extract and the combined acid phase showed about 95% thorium recovery and about 90% yttrium recovery based on the amounts of these metal values originally present in the source liquor. Substantially complete separation of thorium and yttrium from each other was achieved.

The following examples will serve to illustrate further the process of the present invention, but are not intended to limit it thereto.

Example I

Aliquots of a synthetic aqueous leach liquor having a pH of about 1.5 and containing about 0.3 g./l. Th, 0.2 g./l. Y and 1.5 g./l. Fe were contacted for 15 seconds at an aqueous:extractant solution volume proportion of about 8:1 with the following extractant solutions: (1) 0.1 M di-(2-ethylhexyl) phosphoric acid (DEHPA) and 0.1 M tributyl phosphate (TBP) in kerosene, (2) 0.1 M DEHPA in kerosene (control), and (3) 0.2 M DEHPA in kerosene (control). The loaded extractant solutions were successively stripped 3 times with 12 M HCl at an organic:stripping volume ratio of 2 and the 3 portions of stripping acid combined for analysis, the total stripping acid:organic volume ratio employed being 1.5.

The results tabulated in Table I show the analyses of the original synthetic solution (L), the raffinates (R), the combined stripping acid solutions (S), and the stripped organic extractant phases (O). The results of this study show that substantially complete separation of thorium and yttrium values was accomplished only when using the mixed organic extractant solution of the present process. The results show the preferential extraction of thorium and yttrium from the synthetic liquor with most of the iron remaining in the raffinate.

were contacted for predetermined times with a 0.1 M DEHPA and 0.1 M TBP solution in kerosene at the indicated aqueous:extractant solution volume proportions. The extractant solutions were stripped twice with 12 M HCl at an organic:stripping acid volume ratio of 2 and the 2 portions of stripping acid combined for analysis, the total stripping acid:organic volume ratio being 1.

The results tabulated in Table II show the analyses of the original leach liquor (L), the raffinates (R), the combined stripping acid solutions (S), and the stripped organic extractant phases (O). In each run, substantially complete separation of thorium values from yttrium values was realized.

TABLE II

| Run No. | Aqueous:Extractant (volume proportions) | Extraction Contact time (seconds) | Solution [1] | Analytical Results (Weight Percent) | | | |
|---|---|---|---|---|---|---|---|
| | | | | Th | Y | Fe | Ca |
| 1 | 8:1 | 15 | L | 0.03 | 0.007 | 0.14 | 0.09 |
| | | | R | 0.003 | (2) | 0.13 | 0.08 |
| | | | S | (2) | 0.03 | (2) | (2) |
| | | | O | 0.29 | (2) | 0.03 | (2) |
| 2 | 8:1 | 30 | L | 0.03 | 0.007 | 0.14 | 0.09 |
| | | | R | (2) | 0.002 | 0.14 | 0.08 |
| | | | S | (2) | 0.02 | (2) | (2) |
| | | | O | 0.28 | (2) | 0.06 | (2) |
| 3 | 4:1 | 15 | L | 0.03 | 0.007 | 0.14 | 0.09 |
| | | | R | (2) | (2) | 0.14 | 0.08 |
| | | | S | (2) | 0.012 | (2) | (2) |
| | | | O | 0.16 | (2) | 0.04 | (2) |
| 4 | 4:1 | 30 | L | 0.03 | 0.007 | 0.14 | 0.09 |
| | | | R | (2) | (2) | 0.14 | 0.10 |
| | | | S | (2) | 0.012 | (2) | (2) |
| | | | O | 0.14 | (2) | 0.05 | (2) |

[1] L=Original liquor.
R=Raffinate.
S=Stripping acid solution.
O=Stripped organic extract.
[2] Not detected.

Example 3

A 0.1 M DEHPA and 0.1 M TBP kerosene extractant solution containing 0.20% thorium and 0.015% yttrium obtained by extracting an acidic aqueous barren leach liquor from uranium recovery operations was contacted once with an equal volume of 1 M $HNO_3$. The results as given in Table III show the operability of 1 M $HNO_3$ as a stripping agent to separate rare earth values from

TABLE I

| Run No. | Extractant [1] | Solution [2] | Analytical Results Weight Percent | | | |
|---|---|---|---|---|---|---|
| | | | Th | Y | Fe | Ca |
| 1 | 0.1M DEHPA and 0.1M TBP | L | 0.03 | 0.02 | 0.15 | 0.05 |
| | | R | 0.003 | 0.002 | 0.12 | 0.07 |
| | | S | (3) | 0.015 | (3) | (3) |
| | | O | 0.32 | (3) | 0.02 | (3) |
| 2 (control) | 0.1M DEHPA | L | 0.03 | 0.02 | 0.15 | 0.05 |
| | | R | 0.006 | 0.006 | 0.13 | 0.05 |
| | | S | 0.005 | 0.014 | (3) | (3) |
| | | O | 0.30 | (3) | 0.005 | (3) |
| 3 (control) | 0.2M DEHPA | L | 0.03 | 0.02 | 0.15 | 0.05 |
| | | R | (3) | 0.002 | 0.11 | 0.08 |
| | | S | 0.017 | 0.028 | 0.02 | (3) |
| | | O | 0.31 | (3) | 0.0025 | (3) |

[1] Kerosene solution.
[2] L=Original liquor.
R=Raffinate.
S=Stripping acid solution.
O=Stripped organic extract.
[3] Not detected.

Example 2

Portions of a residual barren sulfate leach liquor resulting from the processing of a uranium ore and containing about 0.3 g./l. Th, 0.07 g./l. Y, and 1.4 g./l. Fe thorium values when these are present in the mixed extraction solvent employed in the present process.

TABLE III

|  | Weight Percent | |
|---|---|---|
|  | Th | Y |
| Loaded solvent phase | 0.20 | 0.015 |
| HNO₃ strip solution | (¹) | 0.013 |
| Stripped organic extractant | 0.20 | (¹) |

¹ Not detected.

Example 4

To illustrate the effect of the normality of HCl stripping solutions and the effect of organic:stripping acid volume proportions on the separation of thorium and yttrium values, aliquots of a loaded 0.1 M DEHPA and 0.1 M TBP kerosene extractant solution containing about 0.20 wt. percent Th and 0.10 wt. percent Y were stripped by single contact with 6 M HCl and 9 M HCl at organic: stripping acid volume proportions of 1:1, 5:1, 10:1, and 15:1. The analyses of the stripping acid solutions (S) and the stripped organic extractant phases (O) are tabulated in Table IV.

TABLE IV

| Run No. | Strip Acid | Extract:Acid (volume proportions) | Analytical Results | | |
|---|---|---|---|---|---|
|  |  |  | Solution ¹ | Weight Percent | |
|  |  |  |  | Th | Y |
| 1 | 9 M HCl | 1:1 | E | 0.20 | 0.10 |
|  |  |  | S | 0.03 | 0.10 |
|  |  |  | O | 0.18 | 0.001 |
| 2 | 9 M HCl | 5:1 | E | 0.20 | 0.10 |
|  |  |  | S | 0.04 | 0.50 |
|  |  |  | O | 0.20 | 0.002 |
| 3 | 9 M HCl | 10:1 | E | 0.20 | 0.10 |
|  |  |  | S | 0.06 | 0.98 |
|  |  |  | O | 0.21 | 0.002 |
| 4 | 9 M HCl | 15:1 | E | 0.20 | 0.10 |
|  |  |  | S | 0.07 | 1.37 |
|  |  |  | O | 0.21 | 0.003 |
| 5 | 6 M HCl | 1:1 | E | 0.20 | 0.10 |
|  |  |  | S | 0.18 | 0.10 |
|  |  |  | O | 0.08 | <0.001 |
| 6 | 6 M HCl | 5:1 | E | 0.20 | 0.10 |
|  |  |  | S | 0.45 | 0.46 |
|  |  |  | O | 0.14 | 0.002 |
| 7 | 6 M HCl | 10:1 | E | 0.20 | 0.10 |
|  |  |  | S | 0.66 | 0.78 |
|  |  |  | O | 0.16 | 0.003 |
| 8 | 6 M HCl | 15:1 | E | 0.20 | 0.10 |
|  |  |  | S | 0.74 | 1.03 |
|  |  |  | O | 0.17 | 0.016 |

¹ E = Loaded organic extract.
S = Stripping acid solution.
O = Strippped organic extract.

Results similar to those described in the foregoing examples are obtained when mixtures of dialkyl phosphoric acids and dialkyl alkylphosphonates such as diamyl amylphosphonate, mixtures of dialkyl phosphoric acids and alkyl dialykylphosphinates, and mixtures of dialkyl phosphoric acids and trialkylphosphine oxides are employed as extractants in the instant process.

Various modifications can be made in the present invention without departing from the spirit or scope thereof for it is understood that I limit myself only as defined in the appended claims.

I claim:
1. A process for separating thorium values from rare earth values comprising; (1) providing a ferric iron contaminated acidic aqueous solution containing thorium and rare earth values, (2) contacting said aqueous solution with a substantially water-immiscible liquid organic extractant comprising a mixture of a dialkyl substituted orthophosphoric acid and a second phosphonyl group containing member selected from the group consisting of trialkyl phosphates, dialkyl alkylphosphonates, alkyl dialkylphosphinates, and trialkylphosphine oxides and mixtures thereof thereby to extract said thorium and rare earth values into the organic phase, the molar proportions of said dialkyl substituted orthophosphoric acid and said second phosphonyl group containing member ranging from about 3:1 to about 1:3, (3) separating the resulting thorium and rare earth value containing organic extract from the residual acidic aqueous phase the major portion of said ferric iron remaining in said aqueous phase, (4) contacting said organic extract with a mineral acid member selected from the group consisting of hydrochloric acid of from about 6 molar to about 12 molar concentration and nitric acid of from about 0.5 molar to about 12 molar concentration, whereinafter the thorium values are preferentially contained in the organic phase and the rare earth values are preferentially contained in the aqueous phase, and (5) separating the two phases.

2. The process as defined in claim 1 wherein the organic extractant comprises a mixture of a dialkyl substituted orthophosphoric acid and a trialkyl phosphate, the number of carbon atoms present in each alkyl group of said dialkyl substituted orthophosphoric acid and said trialkyl pjhosphate ranging from 4 to about 18.

3. The process as defined in claim 1 wherein the organic extractant is carried in a liquid carrier, said carrier being substantially insoluble in the phases contacted therewith but said extractant and said thorium and rare earth containing organic extract being soluble therein, the concentration of said dialkyl substituted orthophosphoric acid in said carrier being from about 0.05 molar to about 1 molar.

4. The process as defined in claim 3 wherein the pH of the acidic aqueous solution is from about 0.4 to about 3.0 and wherein the organic extractant comprises a mixture of a dialkyl substituted orthophosphoric acid and a trialkyl phosphate, the number of carbon atoms present in each alkyl group of said dialkyl substituted orthophosphoric acid and said trialkyl phosphate ranging from 4 to about 18, and including the step of contacting said acidic aqueous solution with the organic extractant for a period of from about 0.25 to about 5 minutes.

5. The process as defined in claim 4 wherein the mineral acid member is selected from the group consisting of hydrochloric acid of from about 9 molar to about 12 molar concentration and nitric acid of from about 0.5 molar to about 10 molar concentration.

6. The process as defined in claim 4 wherein the organic extractant comprises a mixture of di-(2-ethylhexyl) orthophosphoric acid (DEHPA) and tributyl phosphate in kerosene and the concentration of said DEHPA in said kerosene is from about 0.05 molar to about 0.3 molar.

7. The process as defined in claim 6 wherein the acidic aqueous solution has a pH of from about 1.0 to about 2.5, and wherein said acidic aqueous solution is contacted with the organic extractant for a period of from about 0.5 to about 1 minute.

8. The process as defined in claim 7 wherein the mineral acid member is selected from the group consisting of hydrochloric acid of from about 9 molar to about 12 molar concentration and nitric acid of from about 1 molar to about 3 molar concentration.

References Cited

UNITED STATES PATENTS

| 2,859,094 | 11/1958 | Schmitt et al. | 23—341 |
| 2,945,742 | 7/1960 | Christensen et al. | 23—341 X |
| 3,153,568 | 10/1964 | Olson et al. | 23—341 X |

CARL D. QUARFORTH, *Primary Examiner.*

S. TRAUB, R. L. GRUDZIECKI, *Assistant Examiners.*